June 12, 1956   A. P. BIRD ET AL   2,749,568
HEADLIGHT BRUSH
Filed Sept. 14, 1953
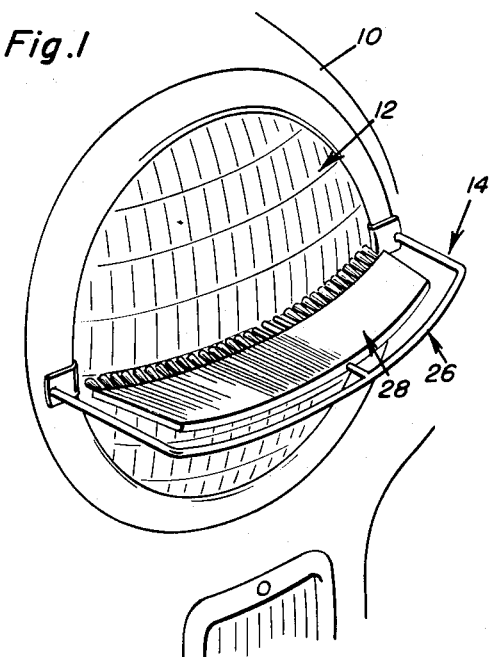
Fig.1
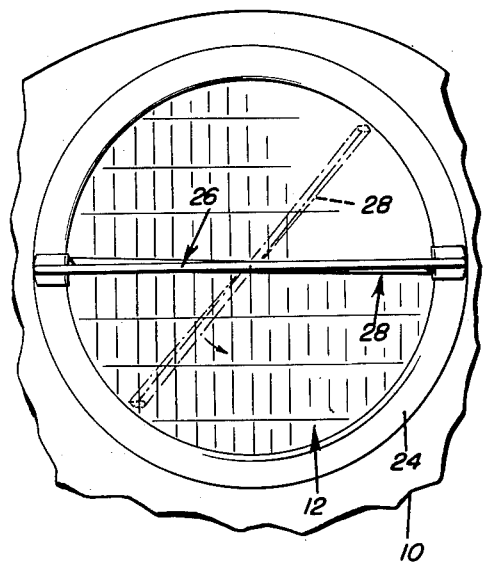
Fig.2
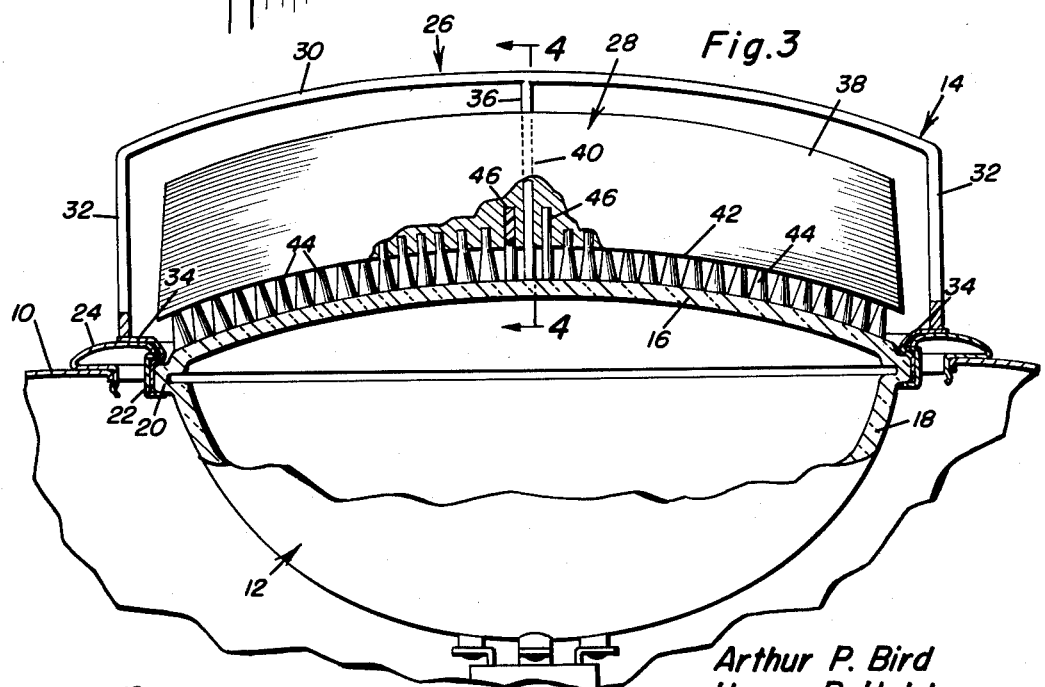
Fig.3
Fig.4
Fig.5
Arthur P. Bird
Harry B. Holston
INVENTORS.

2,749,568

HEADLIGHT BRUSH

Arthur P. Bird, Stollings, and Harry B. Holston, McConnell, W. Va.

Application September 14, 1953, Serial No. 379,782

1 Claim. (Cl. 15—250)

This invention relates in general to improvements in cleaning implements, and more specifically to an automatic brush for vehicle headlights.

When a vehicle drives down the road during rainy weather the same type of dirty water and mud as splashed onto the windshield of such vehicle is also splashed onto the lens of the headlights. The problem of a dirty windshield has been solved through the use of a windshield wiper. However, very few attempts have been made to provide means for automatically cleaning the lens of headlights. As a result, when vehicles drive down rainy roads at night time a driver's visibility is greatly reduced, not because of the dirtiness of a windshield, but because of the headlights of such vehicles are not nearly effective as normal when the lenses thereof are clean.

It is the primary object of this invention to provide an improved brush which may be conveniently mounted relative to a headlight lens so as to automatically clean such headlight lens while an associated vehicle is being driven along the road.

Previous attempts to provide headlight lenses with brushes have resulted in the use of suction cups and the like for the mounting of such brushes. However, when a brush or other cleaning implement is secured to a headlight lens by a suction cup, even if an adhesive is utilized in addition to the suction cup, the cleaning implement may be quickly and easily removed by others so that the cleaning implement is frequently stolen.

It is another object of this invention to provide an improved mounting bracket for a headlight lens brush which may be conveniently attached to a retaining ring of a headlight and which is retained in place by such retaining ring so as to prevent removal thereof by vandals and others.

The major attempts to provide headlight cleaning brushes have resorted to the field of cleaning implements having rubber squeegees or the like of the type normally utilized in windshield wipers. However, inasmuch as the headlight lenses have embossed on the outer surface thereof the manufacturer's trade-name and the like, cleaning implements of these types lift off of the surface of the lens when first engaging the embossed indicia and remain out of engagement with the lenses until they pass thereover. This results in a smearing of a major portion of the headlight lens.

It is therefore another object of this invention to provide an improved headlight lens brush which utilizes a plurality of bristles which may individually engage embossed surfaces of a lens so as to prevent lifting of the cleaning brush off of the lens and permit a portion of the lens to remain uncleaned.

A further object of this invention is to provide an improved headlight cleaning brush which includes means for restricting the deformation of bristles due to pressure exerted thereon while the brush is moving forward at a high speed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of one headlight of a vehicle and shows the same having mounted thereon the headlight brush which is the subject of this invention;

Figure 2 is a front elevational view of the headlight of Figure 1, an alternate position of the headlight brush being shown in dotted lines;

Figure 3 is an enlarged fragmentary horizontal sectional view taken substantially through the center of the headlight of Figure 1 and shows the specific construction of the headlight brush and its relationship to the headlight lens;

Figure 4 is an enlarged fragmentary sectional view taken substantially upon the plane indicated by the section line 4—4 of Figure 3 and shows the relationship of the brush portion of the headlight brush with respect to a mounting bracket therefor; and Figure 5 is an enlarged perspective view of one end of the mounting bracket and shows the general outline of the clip utilized for engagement with the retaining ring for the headlight.

Referring now to the drawings in detail, it will be seen that there is illustrated a forward portion of a vehicle 10 which includes a sealed beam headlight 12 of the conventional type utilized in vehicles. Also carried by the vehicle 10 in overlying relation relative to the front of the headlight 12 is the headlight brush which is the subject of this invention, the headlight brush being referred to in general by the reference numeral 14.

Referring now to Figure 3 in particular, it will be seen that the headlight 12 includes a convex lens 16 which is sealed with respect to a reflector 18. The joint between the lens 16 and the reflector 18 results in an outwardly projecting annular mounting flange 20.

It will be noted that the headlight 12 is retained in position relative to the remainder of the vehicle 10 by a retaining ring 22 which is generally channel-shaped in cross-section and which engages the mounting flange 20 of the headlight 12.

It will be understood that the headlight 12 and the retaining ring 22 are seated in an opening in the vehicle 10 and that said opening is normally covered by an ornamental trim strip 24.

The headlight brush 14 includes a mounting bracket 26 which has mounted thereon for rotation a brush element which is referred to in general by the reference numeral 28. The mounting bracket 26 is secured to the retaining ring 22 in a manner to be described in detail hereinafter and retains the brush element 28 in overlying relation with respect to the outer face of the lens 16.

The mounting bracket 26 includes an arcuate portion 30 which has connected to the ends thereof a pair of depending legs 32. The legs 32 terminate in hook-shaped clips 34. It will be noted that the clips 34 are formed of strips of metal and are so shaped so that they may interlock within the confines of the retaining ring 22 between the retaining ring and the mounting flange 20. The clips 34 are so designed whereby the mounting bracket 26 may be removed only by loosening the fasteners (not shown) which hold the retaining ring 22 in place and sliding the headlight 12 relative thereto.

The mounting bracket 26 also includes a rearwardly extending shaft 36 which is carried by the intermediate portion 30. The shaft 36 is of a length such that when the mounting bracket 26 is properly positioned the free or rear end thereof is in engagement with the center of the lens 16.

The brush element 28 includes an arcuate backing 38 which is twisted so as to be of propeller shape. Extending transversely through the backing 38 is a bore 40 through which the shaft 36 projects so that the brush element 28 may conveniently revolve about the shaft 36.

It will be noted that the arcuate backing 38 is provided with a concave rear edge 42 which is concentric with the outer face of the lens 16. Radiating rearwardly from the concaved rear edge 42 is a plurality of bristles 44. The bristles 44 are disposed at spaced intervals along the length of the edge 42 and engage the outer surface of the lens 16 for cleaning the same.

It will be understood that when the vehicle 10 is going forward the wind caused by the forward motion of the vehicle 10 will strike the brush element 28 and coact with the propeller shaped backing 38 to cause rotation of the brush element. This results in the rotation of the bristles 44 over the surface of the lens 16. Inasmuch as the bristles 44, although they are stiff, are deformable the individual bristles may be deformed when striking an irregular surface on the face of the lens 16, such as embossment, and thereby permit cleaning of the entire outer surface of the lens 16. When the vehicle 10 is traveling at a high rate of speed, a relatively great pressure is exerted on the brush element 28 to move the same rearwardly towards the lens 16. This would normally cause extreme deformation of the bristles 44 and the quick wearing out of the same. In order to prevent this, the arcuate edge 42 is provided on opposite sides of the bore 40 with a pair of rearwardly projecting guide pins 46. The guide pins 46 project rearwardly from the arcuate edge 42 a distance slightly less than the length of the bristles 44 so as to permit limited deformation of the bristles 44 so that they may perform in the desired manner. The guide pins 46 are preferably formed of the same material as the bristles 44 so that they will wear at the same rate as the bristles 44. This permits the self adjusting of the brush element 28 relative to the lens 16.

In view of the foregoing, it will be seen that there has been illustrated and described a headlight brush which is so constructed whereby the same may be conveniently, yet semipermanently, connected to a vehicle in overlying relation with respect to a headlight thereof. Further, the headlight brush is of such a nature whereby it will efficiently clean the outer surface of a lens regardless of the irregularities thereof.

Not only does the headlight brush 14 permit a greater vision on the part of an operator of a vehicle so equipped due to the continuous cleansing of the lens of the headlights thereof, but also inasmuch as the backing 38 is preferably formed of a colored plastic material which continuously rotates in front of the lens 16, the light emitting from the light 12 is diffused so as to cut down on the glare. The color of the backing 38 may be of any desired tint although it may be found by experiment that certain tints may be more desirable.

Inasmuch as the mounting bracket for the headlight brush projects outwardly in front of the headlight cleaning brush element thereof, it functions as a guide against the accidental breaking of the brush element. This is particularly highly desirable inasmuch as most service station attendants automatically make an attempt to wipe off the surface of the lens of the headlights. Further, the relationship of the mounting bracket with respect to an associated headlight is such that the irregular contours of the lens of such a headlight will not result in mounting difficulties.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

For use with headlights of the type retained in place by a retaining ring, a headlight lens cleaning brush, said brush comprising a mounting bracket and a lens contacting brush element carried by said mounting bracket, said mounting bracket being generally U-shaped and including hook shaped clips selectively engageable with a headlight retaining ring, said brush element including an arcuate back including a concave edge adjacent an associated lens, said concave edge being concentric with the lens and having projecting bristles, said concave edge being provided with centrally located guide pins, said guide pins being engageable with the lens to limit deformation of said bristles.

References Cited in the file of this patent

UNITED STATES PATENTS

| | | |
|---|---|---|
| 1,526,283 | Hill | Feb. 10, 1925 |
| 1,561,801 | Shipley | Nov. 17, 1925 |
| 1,920,144 | Hueber | July 25, 1933 |
| 2,288,429 | Baughn | June 30, 1942 |

FOREIGN PATENTS

| | | |
|---|---|---|
| 564,789 | Great Britain | Oct. 12, 1944 |